United States Patent

Hashimoto et al.

[11] 4,319,693
[45] Mar. 16, 1982

[54] FILTER CAP

[75] Inventors: Nobuyuki Hashimoto; Atsushi Satomoto, both of Toyota, Japan

[73] Assignee: Aisin Seiki Kabushiki Kaisha, Kariya, Japan

[21] Appl. No.: 188,736

[22] Filed: Sep. 19, 1980

[30] Foreign Application Priority Data

Sep. 19, 1979 [JP] Japan .................................. 54-129674

[51] Int. Cl.³ ............................................. B65D 51/16
[52] U.S. Cl. ..................................... 220/373; 220/306
[58] Field of Search ............... 220/371, 373, 306, 374; 215/307, 308

[56] References Cited

U.S. PATENT DOCUMENTS 3,921,849 11/1975 Fernberg et al. .................... 220/373
4,130,222 12/1978 Ono ...................................... 220/373

Primary Examiner—George T. Hall
Attorney, Agent, or Firm—Oblon, Fisher, Spivak, McClelland & Maier

[57] ABSTRACT

A filter cap made of resinous material, and includes a housing with ceiling wall, a circumferential wall, an atmospheric port formed in the circumferential wall, and edges having a slanting surface. The filter cap reliably ensures installation in various devices and improves the corresponding assembly and resulting work efficiency of such devices. The filter cap can house an air filter in a predetermined location and protect an associated air passageway from water and foreign deposits such as, for example, mud.

7 Claims, 4 Drawing Figures

FILTER CAP

BACKGROUND OF THE INVENTION

1. Field of the Invention

This invention relates to filter caps in general, and more particularly to a filter cap which can house an air filter in a predetermined location and protect an associated air passageway from water and foreign deposits such as, for example, mud.

2. Description of the Prior Art

Since a conventional filter cap is known as being made of rubber material, such filter cap bends easily owing to the elasticity of the rubber material. Therefore, there is a resulting drawback in that the filter cap can be easily detached when a tool is applied to the filter cap. Furthermore, there is a drawback in that the working time for assemby is relatively long since the assembling efficiency is correspondingly inferior. The reason why the filter cap made of rubber material is adopted in this manner is that it is in some instances desirable to detach the filter cap owing to the elasticity of the rubber material.

SUMMARY OF THE INVENTION

It is a principal object of the present invention to eliminate the drawbacks of prior art filter caps due to the determination that it it unnecessary to detach the filter cap in consideration of the function of the filter cap.

More particularly, it is an object of the present invention to provide a filter cap which is made of resinous material.

It is another object of the present invention to provide a filter cap which ensures installation in various devices and improves the assembly and resulting work efficiency.

BRIEF DESCRIPTION OF THE DRAWINGS

Other objects, features and advantage of the present invention will become more apparent with reference to the succeeding detailed description thereof, and to the drawings illustrating a preferred embodiment thereof wherein like reference numerals denote the same structural elements.

DETAILED DESCRIPTION OF THE PREFERRED EMBODIMENTS

Figure 1:
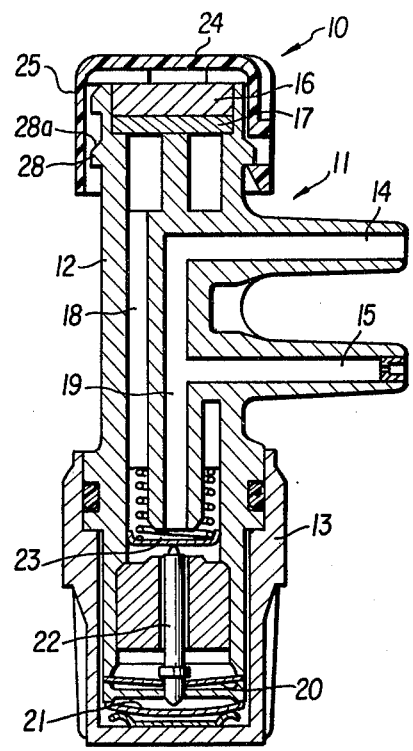
FIG. 1 is a vertical sectional view of a thermal responsive switching valve device incorporating the filter cap of the present invention.
Figure 2:
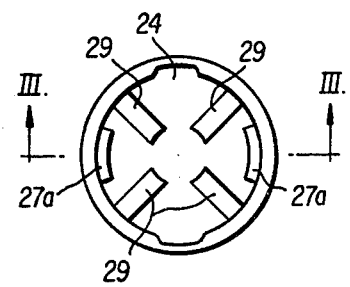
FIG. 2 is a plan view of the filter cap of FIG. 1.

Referring now to the drawings, FIG. 1 shows a thermal responsive switching valve device 11 incorporating a filter cap 10 made of resinous material according to the present invention. Valve device 11 includes an upper body member 12 and a lower body member 13 which are connected in any convenient manner to each other.

Lower body member 13 is securely connected to a water jacket (not shown) of an internal combustion engine (not shown). Upper body member 12 includes an input port 14 communicating with an intake manifold (not shown) and an output port 15 communicating with a vacuum responsive valve device (not shown). In the opening bore of the valve device 11 a first air filter 16 and a second air filter 17 are placed.

Within upper body member 12 is formed a first passageway 18 continually communicating with both air filters 16 and 17 and a second passageway 19 continually communicating with the both ports 14 and 15. Communication of both passageways 18 and 19 is controlled by a rod 22 and a poppet valve 23 which are actuated by the snap action of bimetallic disks 20 and 21.

Filter cap 10 which is made of resinous material, as previously indicated, includes a ceiling wall 24 and a circumferential wall 25. A pair of atmospheric ports 26 are formed in circumferential wall 25.

Figure 3:
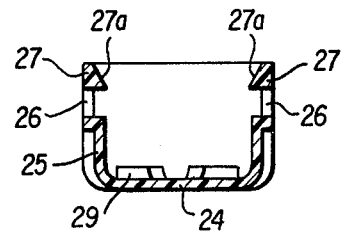
FIG. 3 is a sectional view taken along line III—III of FIG. 2.
Figure 4:
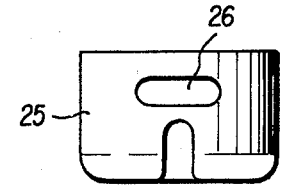
FIG. 4 is a side view of the cap of FIG. 2.

As shown in FIG. 3, edges 27 which are in the form of a sword shaped apex are located in the upper part of each port 26, respectively. Edges 27 which are possible to form by adopting the resinous material to ensure engagement with a circumferential shoulder 28 of the upper body member 12 of the valve device 11.

To explain in greater detail, when filter cap 10 is installed in valve device 11, a slanting surface 27a of the edge 27 of the filter cap 10 will engage with a slanting surface 28a in the form of skirt, of the circumferential shoulder 28 of the upper body member 12, whereby filter cap 10 is enlarged and transformed to some degree. After finishing engaging with slanting surface 28a, edge 27 engages with the circumferential shoulder 28 and is returned to its original form, thereby making the detachment of filter cap 10 impossible. Furthermore, four projections 29 are formed within celing wall 24. When the ceiling wall 24 is attached to the first air filter 16, an air passageway is formed between ceiling wall 24 and projections 29.

From the foregoing it will be apparent that the present invention has provided a filter cap which ensures assembly in various devices and improves the working efficiency thereof since the filter cap is made of resinous material.

It will be apparent to those skilled in the art that the filter cap of the present invention may be constructed in a variety of ways without, however, departing from the scope and spirit of the appended claims.

What is claimed as new and desired to be secured by Letters Patent of the United States is:

1. A filter cap made of resinous material, said filter cap comprising:
   a ceiling wall member;
   a circumferential wall member;
   atmospheric port means formed in said circumferential wall; and
   edge means having a slanting surface formed on said circumferential wall member.

2. A filter cap according to claim 1, wherein each edge means comprises at least two edge members.

3. A filter cap according to claim 1, wherein said edge means comprises a sword shaped apex member.

4. A filter cap according to claims 1, 2 or 3 further comprising projection means formed within said ceiling wall.

5. A filter cap according to claims 1, 2, or 3 wherein said edge means comprises at least one inwardly extending and radially positioned member disposed adjacent said atmospheric port means.

6. A filter cap according to claim 4, wherein said projection means comprises at least one inwardly extending and radially positioned member disposed adjacent said atmospheric port means opposite said edge means.

7. A filter cap according to claims 1, 2, or 3 wherein said edge means comprises at least one inwardly extending and radially positioned member disposed adjacent said atmospheric port means and said projection means comprises at least one inwardly extending and radially positioned member disposed adjacent said atmospheric port means opposite said edge means.

* * * * *